United States Patent [19]

Kobayashi

[11] Patent Number: 5,172,787

[45] Date of Patent: Dec. 22, 1992

[54] RESTRICTING DEVICE FOR A DIFFERENTIAL IN A MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 772,628

[22] Filed: Oct. 7, 1991

Related U.S. Application Data

[63] Continuation of Ser. No. 513,485, Apr. 20, 1990, abandoned.

[30] Foreign Application Priority Data

Apr. 28, 1989 [JP] Japan ............................ 1-111736

[51] Int. Cl.⁵ ............................................ B60K 17/34
[52] U.S. Cl. ............................ 180/197; 180/233; 180/247; 180/248; 364/426.03; 475/231
[58] Field of Search ............... 180/197, 233, 247, 248, 180/249; 475/231, 232, 233; 364/426.03; 192/30 R, 31

[56] References Cited

U.S. PATENT DOCUMENTS

| 4,466,502 | 8/1984 | Sakai | 180/247 |
| 4,484,653 | 11/1984 | Horikoshi et al. | 180/197 |
| 4,681,180 | 7/1987 | Oyama et al. | 180/76 |
| 4,712,635 | 12/1987 | Sumiya et al. | 180/197 |
| 4,757,870 | 7/1988 | Torii et al. | 180/197 |
| 4,790,404 | 12/1988 | Naito | 180/197 |
| 4,874,059 | 10/1989 | Kasegawa | 180/197 |
| 4,895,217 | 1/1990 | Hueckler et al. | 180/249 |
| 4,953,654 | 9/1990 | Imaseki et al. | 180/197 |

FOREIGN PATENT DOCUMENTS

| 62-103227 | 5/1987 | Japan . | |
| 226446 | 9/1989 | Japan | 180/197 |
| 593944 | 2/1978 | U.S.S.R. | 180/197 |

Primary Examiner—Mitchell J. Hill
Attorney, Agent, or Firm—Martin A. Farber

[57] ABSTRACT

A restricting device for a differential is provided in a transaxle. A fluid-operated restricting clutch is provided adjacent a differential and disposed between a differential case and a corresponding axle so as to restrict differential operation of the differential. Clutch pressure of each clutch is controlled in accordance with driving conditions of a vehicle.

8 Claims, 9 Drawing Sheets

RESTRICTING DEVICE FOR A DIFFERENTIAL IN A MOTOR VEHICLE

This application is a continuation of my co-pending application Ser. No. 07/513,485, filed Apr. 20, 1990, now abandoned.

BACKGROUND OF THE INVENTION

The present invention relates to a device for restricting the differential operation of a differential of a motor vehicle, and more particularly to a device comprising a fluid-operated multiple-disk friction clutch for controlling restriction torque in accordance with driving conditions of the motor vehicle.

In a motor vehicle, a differential is provided between the right and left driving wheels to absorb the difference in speeds of the wheels during turning of a corner and distribute driving torque equally to the driving wheels. However, when one of the wheels slips due to a low friction coefficient of the road surface or because of a decrease in the load on the wheel, the total distributed driving torque decreases. In order to prevent such a decrease of the torque, a limited slip differential (LSD) where a multiple-disk friction clutch is disposed therein is provided to automatically restrict the differential operation, thereby transmitting sufficient torque to the wheels to drive the vehicle. However, the LSD is operated to restrict the differential operation in accordance with the change in the driving torque, namely with the operation of the accelerator pedal of the vehicle. Therefore, if the accelerator pedal is depressed or released while turning a corner, it becomes difficult to steer the vehicle because of the operation of the LSD. The LSD is therefore used only for a rear differential of a rear drive vehicle, or of a four-wheel drive vehicle, or for a front differential in a particular type of a front drive vehicle.

A viscous coupling containing a high viscous fluid recently has been proposed for restricting the differential operation of the differential. The viscous coupling operates to generate a coupling torque in proportion to the difference between right-wheel speed and left-wheel speed. Thus, the vehicle can be steered while the differential operation is restricted despite the operation of the accelerator pedal.

However, since the coupling torque depends only on the difference between the speeds of the right and left wheels, it is also necessary to determine the torque capacity of the viscous coupling in consideration of the difference in effective diameter of the wheels and of deterioration of the coupling. Particularly, in a vehicle having an antilock braking system (ABS) on a brake system, a viscous coupling having a small torque capacity is preferable to prevent locking thereof when the antilock braking is effected. Hence the differential operation may not always be restricted when necessary. In addition, the viscous coupling is operated only in response to the speed difference, and cannot be intentionally controlled in accordance with the driving conditions and conditions of the road surface.

Japanese Patent Application Laid-Open No. 62-103227 discloses a system for controlling the differential operation of a differential disposed between right and left wheels. In the system, a fluid operated multiple-disk friction clutch is provided between a differential case and a side gear of a differential for producing the torque for restricting the differential operation. Actuating pressure of oil for the clutch is controlled for changing the differential operation restricting torque in dependency on the difference between the speeds of right and left wheels so as to improve the driveability of the motor vehicle. However, the structure of the clutch is too complicated to be easily installed in an ordinary differential.

In addition, the multiple-disk friction clutch uses the oil in the automatic transmission as actuating oil for both actuating and lubricating the clutch, since the oil has a good friction characteristic and a low oil viscosity. On the other hand, a final reduction gear of the differential provided on the outside of the differential case is composed of a hypoid gear. In such a differential, extreme-pressure lubricant contains additives to improve ability to adhere to the surfaces of metals under high bearing pressures. Such a lubricant may cause the multiple disks of the clutch to stick and to slip, which causes unpleasant vibration and noise of the vehicle body.

Moreover, the clutch is applied to an independently disposed rear differential of a rear drive vehicle with front-mounted engine or a four-wheel drive vehicle and not to a differential of a front drive vehicle with a front-mounted engine or a rear drive vehicle with a rear-mounted engine having a transmission of the transaxle type.

SUMMARY OF THE INVENTION

An object of the present invention is to provide a clutch for restricting differential operation of a differential of a transaxle transmission so as to control a differential restricting torque, thereby improving driveability, steerability, driving stability and starting characteristics of a motor vehicle in accordance with the driving conditions and conditions of the road surface.

According to the present invention, there is provided a device for restricting differential operation for a two-wheel drive motor vehicle having a transaxle in which a transmission, a final reduction gear, and a differential are provided for transmitting output torque of an engine to driving wheels.

The device comprises a fluid-operated clutch provided adjacent the differential and disposed between a differential and one of the axles for the driving wheels so as to restrict the operation of the differential, and control means for controlling the clutch pressure of the clutch in accordance with driving conditions of the vehicle.

In an aspect of the invention, the fluid operated clutch is provided in a cover secured to the differential and separated from the differential by an oil seal.

The clutch is disposed coaxially with the axis of the axles and has an outer drum operatively connected to one of a differential case and the axle, an inner drum operatively connected to the other, a plurality of outer disks secured to the outer drum, a plurality of inner disks secured to the inner drum, a piston slidably mounted in a piston chamber and operated by oil supplied to the piston chamber for engaging the outer disks and inner disks with each other, and a centrifugal oil pressure chamber formed adjacent the piston chamber, whereby centrifugal force of oil in the piston chamber does not occur, and the control means includes means for detecting slipping of one of the right and left driving wheels in accordance with the difference between right wheel speed and left wheel speed, and operating means responsive to the slipping for engaging the fluid-operated clutch.

Other objects and features of this invention will become understood from the following description with reference to the accompanying drawings.

DETAILED DESCRIPTION OF THE PREFERRED EMBODIMENTS

Figure 1A:
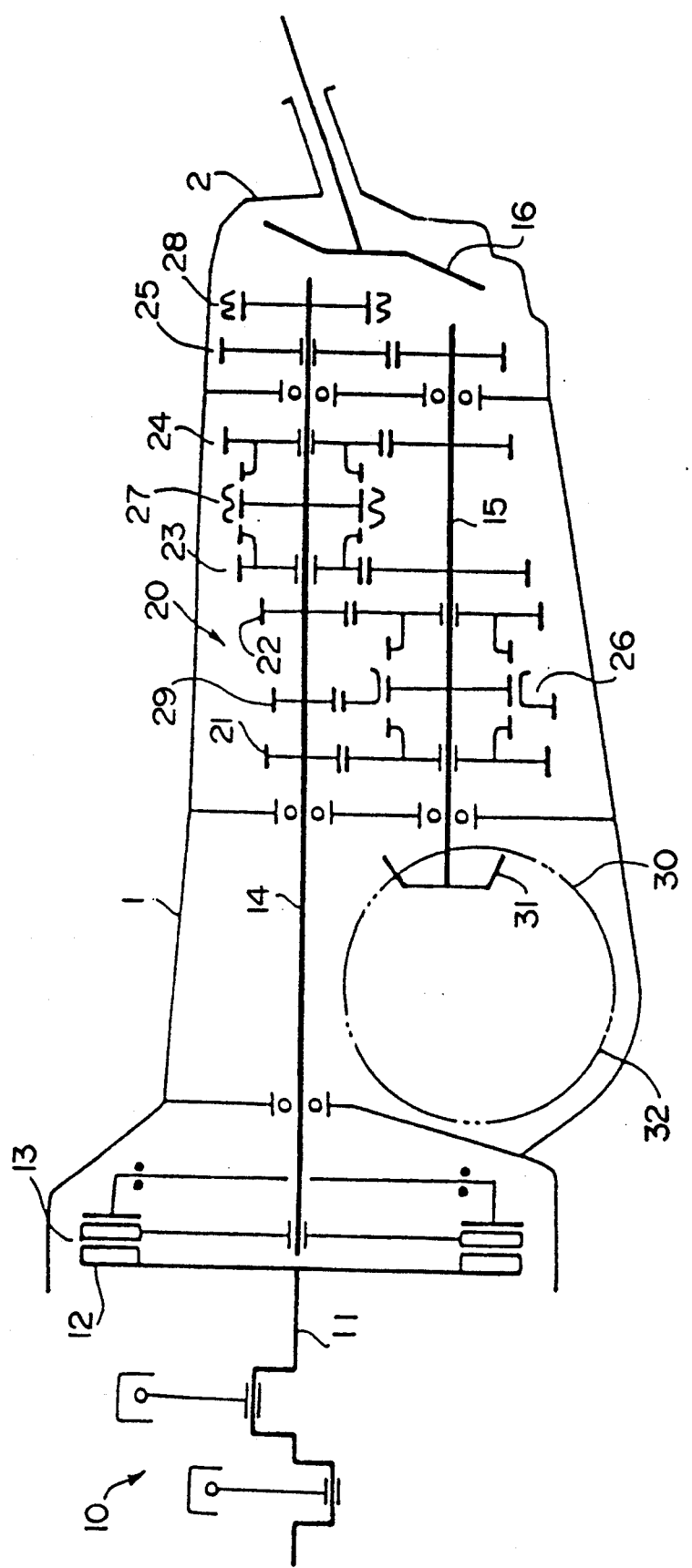
FIGS. 1a and 1b show a schematic diagram of a power transmission system according to the present invention, respectively.
Figure 1B:
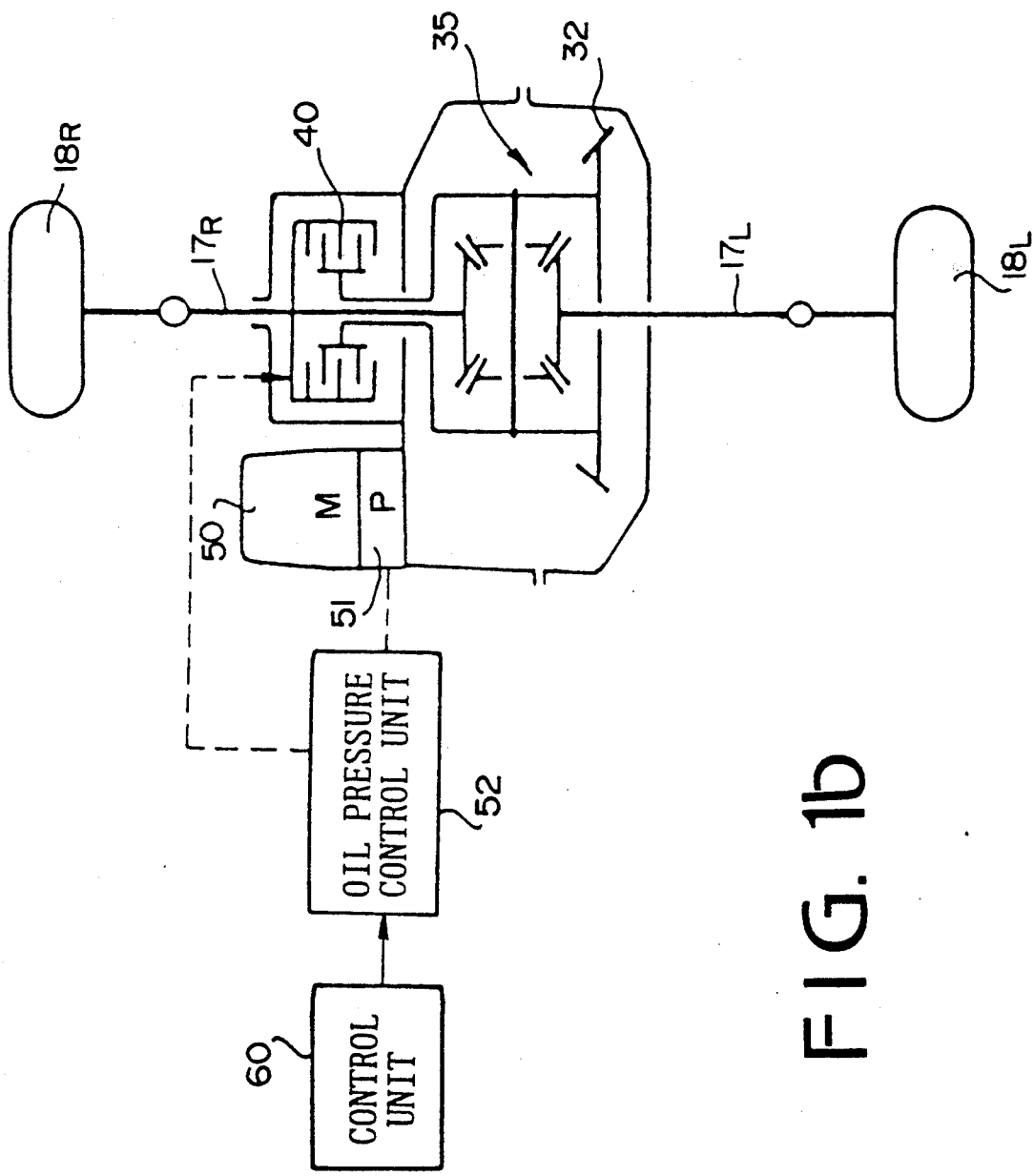

FIGS. 1a and 1b show a power transmission system in a front-wheel drive motor vehicle having an engine 10 longitudinally mounted at a front portion thereof, and a transaxle in which a transmission 20, a final reduction gear 30 and a differential 35 are provided. The engine 10 is connected to the transmission 20 housed in a transmission case 1 and a transmission cover 2 through a crankshaft 11, a clutch 12 and an input shaft 14.

The manual transmission 20 has an output shaft 15 parallel with the input shaft 14, five pairs of change-speed gears 21 to 25 corresponding to first to fifth (overdrive) speed gears and synchronizers 26 to 28. The synchronizers 26 to 28 are disposed between the gears 21 and 22, between 23 and 24 and adjacent the gears 25, respectively. A reverse drive gear 29 mounted on the input shaft 14 is operatively connected with a gear formed on one side of a sleeve of the synchronizer 26 through an idler gear (not shown) for reverse drive.

A synchronizer operating device 16 protruding out of the transmission case 2 to be operatively connected to a shift lever (not shown) at the driver's seat, is connected with the synchronizers 26 to 28 through a shift rod and shift forks (not shown). The operating device 16 is operated to select one of the first to fifth speed gears 21 to 25 and the reverse gear 29. The output shaft 15 is integral with a drive pinion 31 which engages with a ring gear 32 of the final reduction gear 30 of the differential 35 for front wheels 18R and 18L. The power of the engine 10 is transmitted to the front wheels 18R and 18L through the differential 35 and axles 17R and 17L.

A differential restricting clutch 40 is further provided between the differential 35 and the axle 17R so as to restrict the differential operation of the differential 35. The clutch is operated by an oil pressure control unit 52 which is applied with electronic signals from a control unit 60 for controlling the clutch 40 in accordance with various driving conditions. The clutch 40 is supplied with oil by a pump 51 which is provided in the transmission case 1 and driven by a motor 50.

Figure 2A:
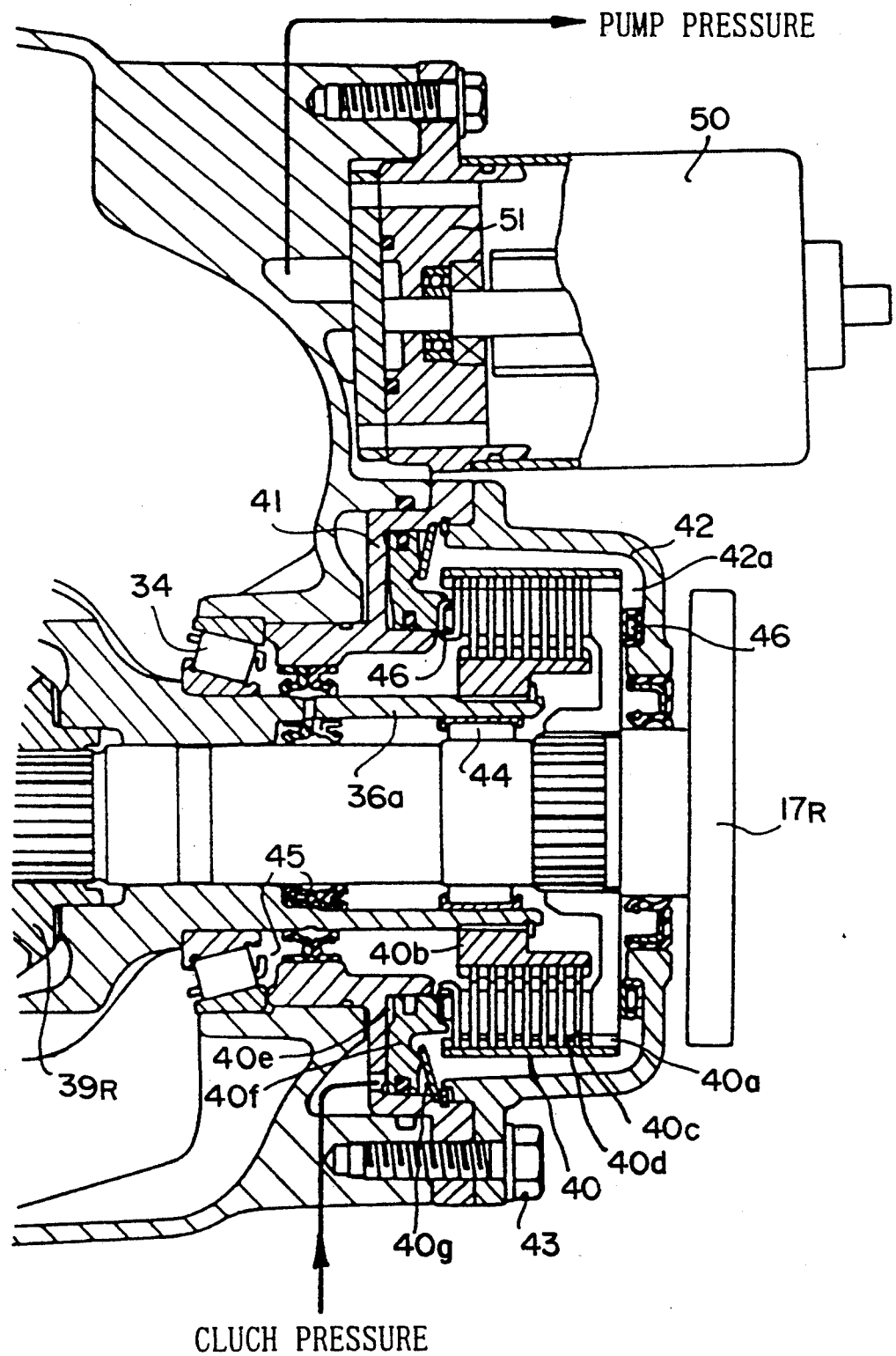
FIGS. 2a and 2b show a sectional view of a main part of the system.
Figure 2B:
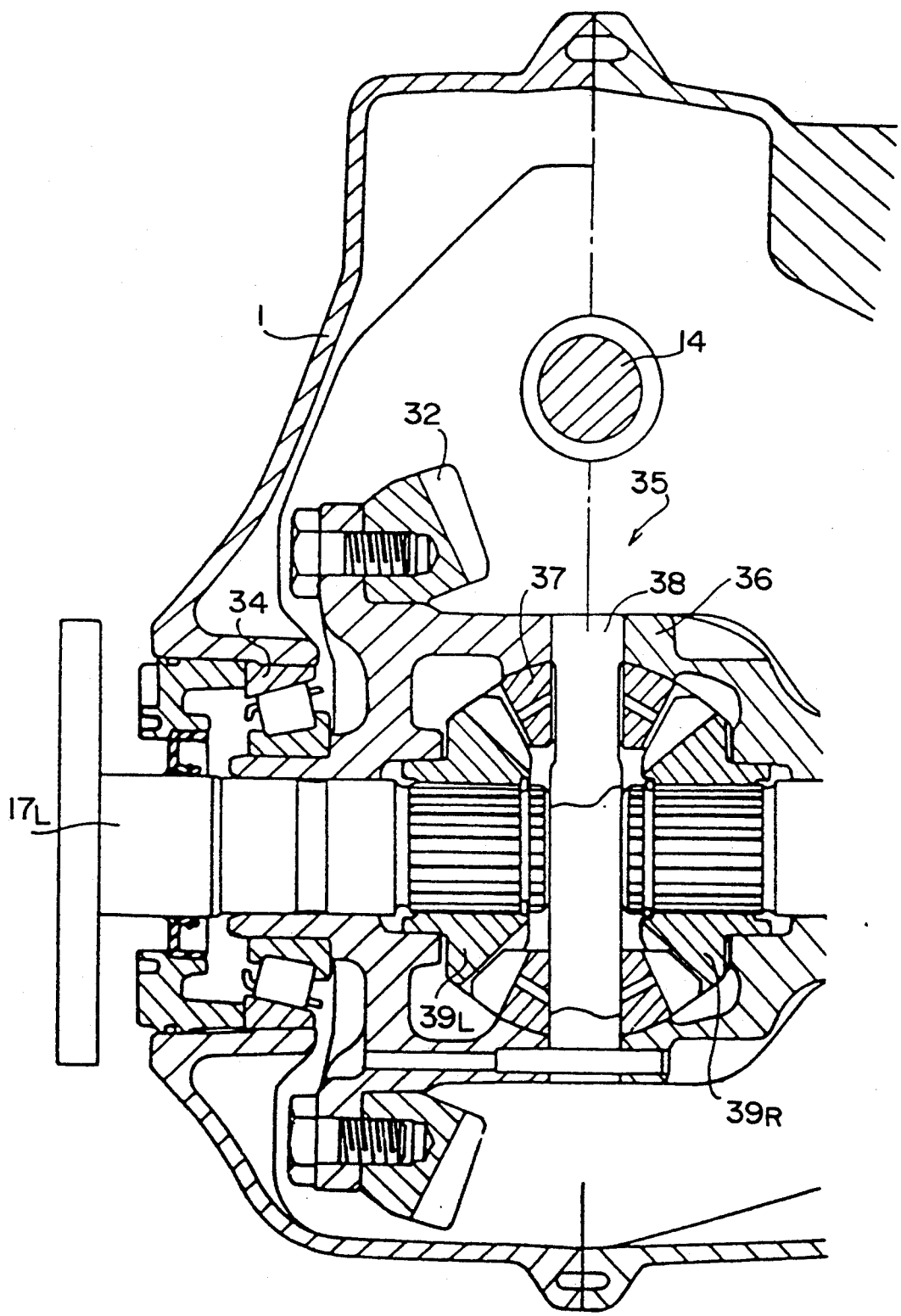

Referring to FIGS. 2a and 2b, the differential 35 housed in a differential case 36 integral with the ring gear 32 comprises a pinion shaft 38 rotatably supported in the case 36, a pair of differential pinions 37 rotatably mounted on the pinion shaft 38, and a pair of side gears 39R and 39L meshed with the pinions 37. The side gears 39R and 39L are connected to the axles 17R and 17L through splines, respectively.

The differential case 36 has a cylindrical portion 36a rotatably supported in the transmission case 1 through a taper roller bearing 34 and housed in a retainer bearing 41 secured to the case 1. The cylindrical portion 36a is rotatably mounted on the axle 17R through a needle bearing 44.

The differential restricting clutch (fluid operated multiple-disk friction clutch) 40 is housed in a bowl-like cover 42 and mounted on the axle 17R and the cylindrical portion 36a of the differential case 36. An oil chamber 42a of the clutch 40 is supplied with oil having characteristics different from that for the hypoid gears of the differential by the oil pump 51 and oil seal 45 is interposed between the clutch 40 and the differential 35 to prevent the different oils from mixing with each other.

The clutch 40 comprises an outer drum 40a secured to the axle 17R and an inner drum 40b splined on the cylindrical portion 36a. A plurality of outer disks 40c are splined on the drum 40a and a plurality of inner disks 40d are splined on the drum 40b, disposed alternately with the disks 40c. A ring piston 40f is slidably mounted on an inner wall of the retainer bearing 41 and on an inner guide portion thereof. The piston 40f is engaged with the outermost disks 40c through a thrust bearing 46 and with a spring 40g. A piston oil chamber 40e is defined between the piston 40f and the retainer bearing 41.

Figure 4A:
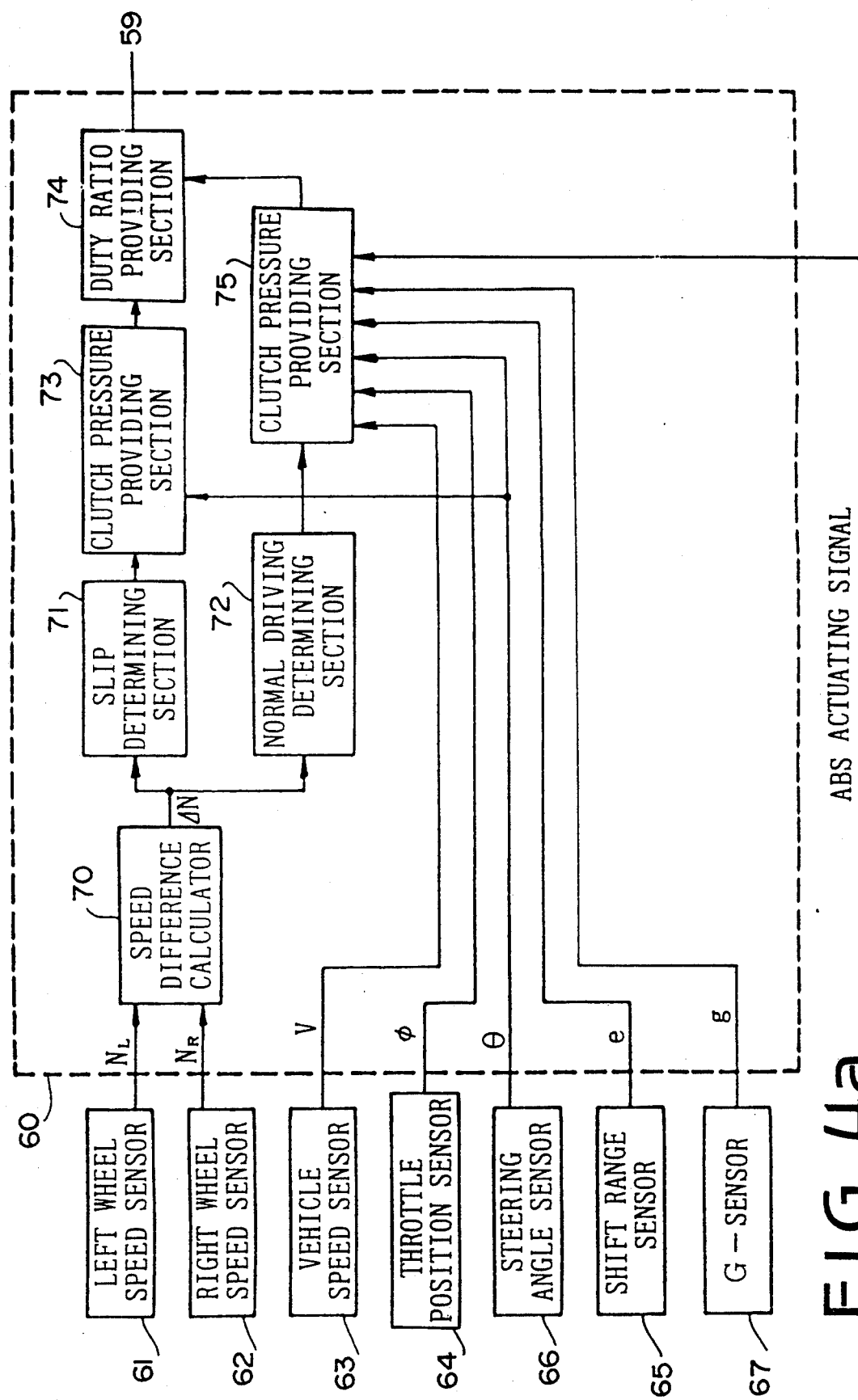
FIGS. 4a and 4b show a hydraulic control system for controlling fluid operated multiple-disk friction clutch of the system.
Figure 4B:
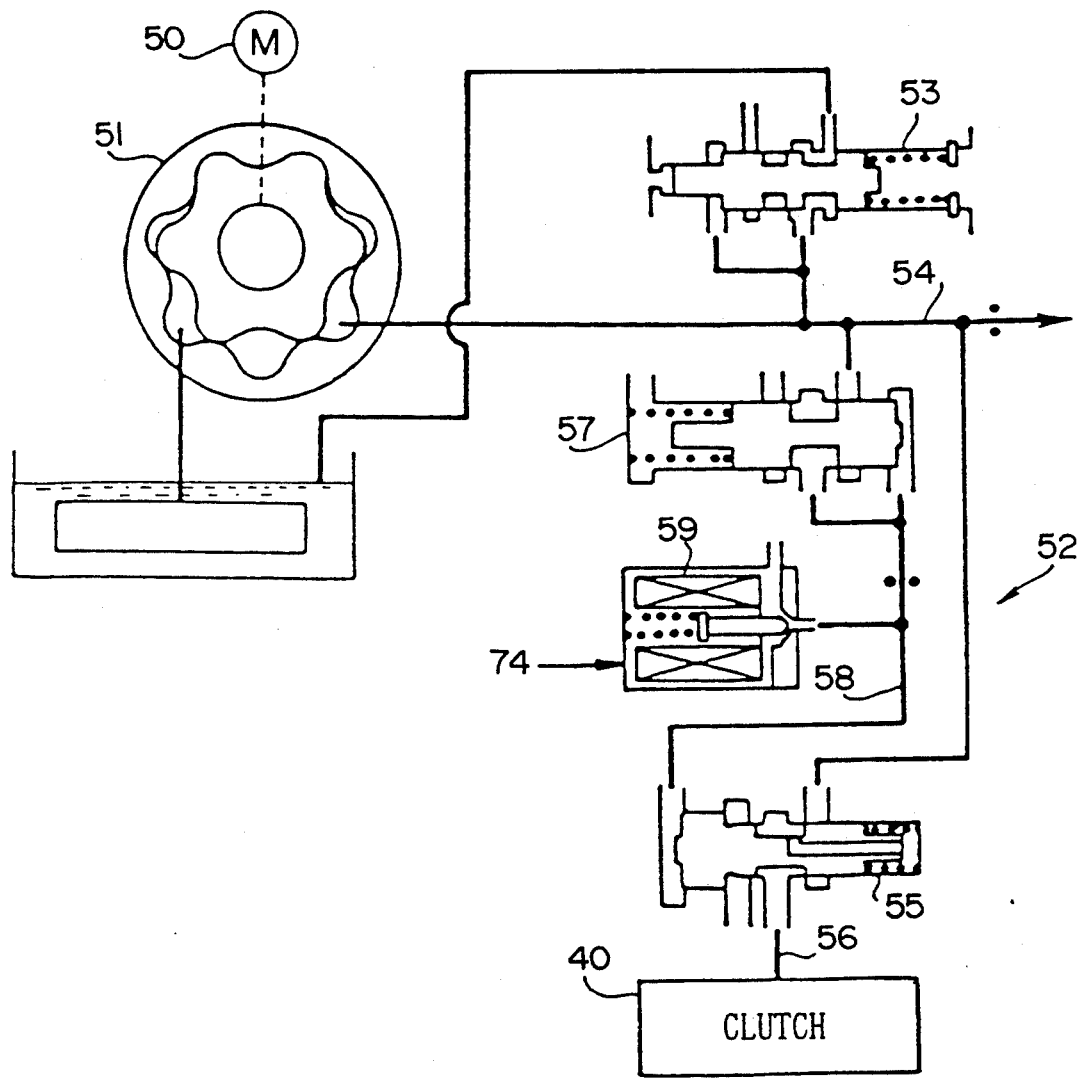

A hydraulic control system for the clutch 40 is described hereinafter with reference to FIGS. 4a and 4b. The hydraulic control system comprises the oil pressure control unit 52 and the control unit 60. The oil pressure control unit 52 has a pressure regulator valve 53, a pilot valve 57, a clutch control valve 55 and a solenoid operated duty control valve 59 for controlling the differential restricting clutch 40.

Oil from the oil pump 51 driven by the motor 50 is supplied to the pressure regulator valve 53 by which the pressure of the oil is regulated to a predetermined value. The oil is fed to the piston chamber 40e of the clutch 40 through an oil passage 54, the clutch control valve 55 and an oil passage 56. The pilot valve 57 operates to provide a constant pilot pressure. The solenoid operated duty control valve 59 is operated by pulses from the control unit 60 at a duty ratio dependent on driving conditions of the vehicle, so that the draining of the oil from the control valve 59 provides a control pressure. The control pressure is applied to an end of the control valve 55 through an oil passage 58 to control the oil supplied to the clutch 40 so as to control the clutch pressure.

The control unit 60 is fed with output signals from a left-wheel speed sensor 61, a right-wheel speed sensor 62, a vehicle speed sensor 63, a throttle position sensor 64, a shift range sensor 65, a steering angle sensor 66 and a G-sensor 67, which are provided for determining the driving conditions of the motor vehicle. A left-wheel speed $N_L$ from the left-wheel speed sensor 61 and a right-wheel speed $N_R$ from the right-wheel speed sensor 62 are applied to a speed difference calculator 70 where a speed difference $\Delta N$ between the left-wheel speed $N_L$ and the right-wheel speed $N_R$ is calculated in accordance with $\Delta N = N_L - N_R$. When the difference $\Delta N$ exceeds a predetermined value, a slip determining section 71 applies a slip signal to a clutch pressure providing section 73. The clutch pressure providing section 73 has a clutch pressure look-up table storing a plurality of maximum clutch pressures P corresponding to the steering angle $\theta$. Namely, the pressure decreases as the steering angle $\theta$ increases. The clutch pressure P is derived from the look-up table in accordance with the steering angle $\theta$ from the steering angle sensor 66. The derived clutch pressure P is fed to a duty ratio providing section 74 where a duty ratio corresponding to the clutch pressure P is obtained. A duty ratio pulse signal from the duty ratio providing section 74 is applied to the solenoid operated valve 59.

When the speed difference $\Delta N$ is smaller than the predetermined value, a normal driving determining section 72 applies a normal driving determining signal to a clutch pressure providing section 75 to derive a clutch pressure from a look-up table. The clutch pressure P is derived from the table in accordance with the vehicle speed V from the vehicle speed sensor 63 and the throttle valve opening degree $\phi$ from the throttle position sensor 64. A large clutch pressure P is derived in high engine load and high vehicle speed ranges. The clutch pressure P is further corrected by a gear ratio e determined by the shift range sensor 65, the steering angle $\theta$ and an acceleration g detected by the G-sensor 67. That is, the clutch pressure is decreased with an increase of the steering angle $\theta$ and increased with an increase of the acceleration g so that an optimum clutch pressure in accordance with driving conditions can be provided. The duty ratio signal corresponding to the clutch pressure P is also fed to the solenoid operated valve 59.

In a vehicle having an antilock braking system on a brake system, when the antilock braking is effected, an ABS actuating signal is applied to the clutch pressure providing section 75 to render the clutch pressure P zero, thereby releasing the clutch 40.

Describing the operation of the system, the power of the engine 10 is transmitted to the manual transmission 20 through the clutch 12. The output of the transmission 20 is transmitted to the front differential 35 through the output shaft 15 and to the front wheels 18R and 18L.

Figure 5:
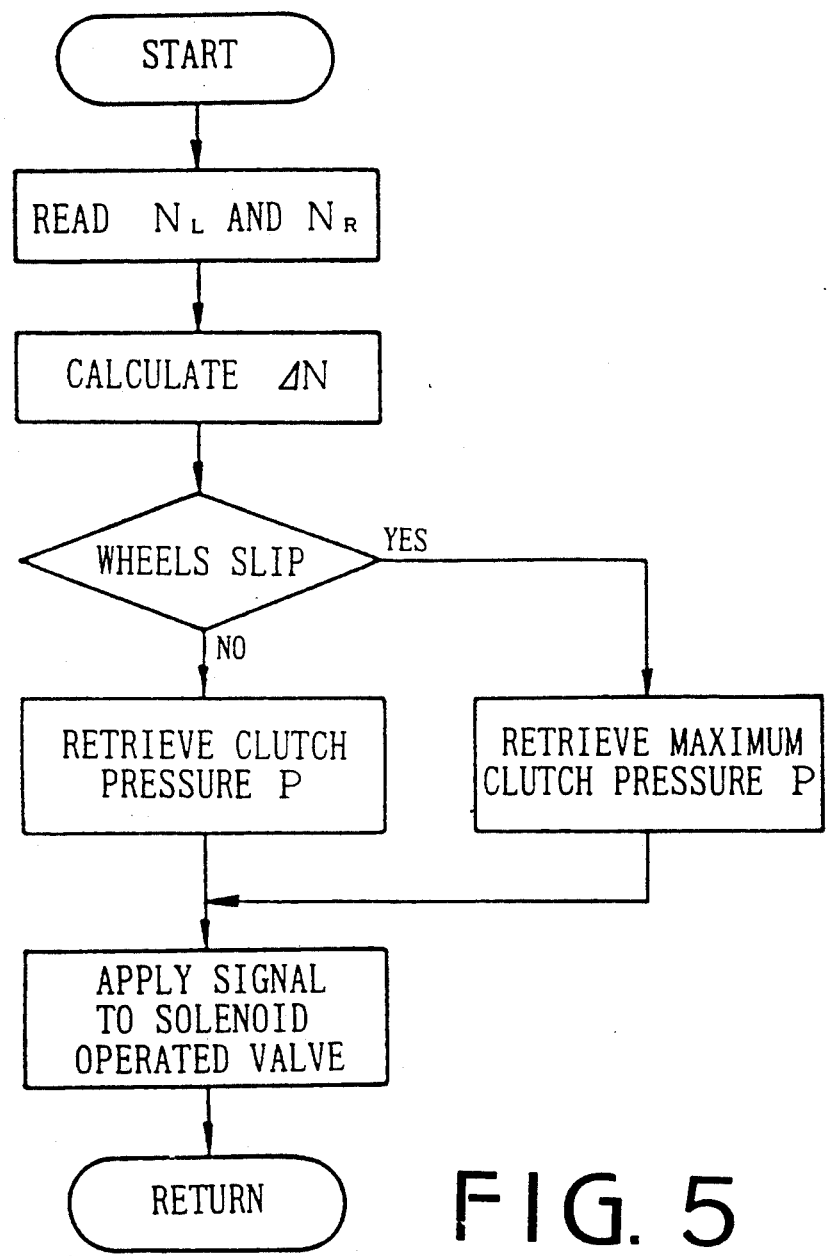
FIG. 5 shows a flowchart showing the operation of a control unit of the system.

While the vehicle is driven, output signals from various sensors representing such factors as the left-wheel speed $N_L$ and the right-wheel speed $N_R$ are fed to the control unit 60 to carry out a program shown in FIG. 5.

When the vehicle is driven on a road the friction coefficient of which differs from the right side to the left side, and when one of the wheels 18L and 18R slips, it is determined that the wheel is slipping in accordance with the large speed difference $\Delta N$. Thus, the clutch pressure P for the clutch 40 becomes maximum so that the piston 40f presses the disks 40c and 40d, thereby generating differential operation restricting torque between the differential case 36 and the side gears 39R. As a result, the differential 35 is locked to provide stable driving and to effectively transmit torque to the rear wheels 18L and 18R, thereby ensuring driveability.

When the vehicle is normally driven on a dry road, the speeds $N_L$ and $N_R$ are substantially equal ($N_L \approx N_R$). Therefore, the clutch pressure P is set to a proper value in accordance with the driving conditions. When the vehicle speed V and the throttle opening degree $\phi$ are small, the clutch pressure P is set to substantially zero so as to release the clutch 40.

More particularly, the solenoid operated valve 59 operates to shift a spool of the clutch control valve 55 against the spring, thereby draining the piston chamber 40e of the clutch 40 through the control valve 55. Thus, the differential 35 becomes free. As a result, the vehicle can be driven around a corner with the differential operation.

At a start or at acceleration of the vehicle, when the throttle opening degree $\phi$ or the vehicle speed V increases, the clutch pressure P also increases, thereby generating differential restricting torque. Thus, good driveability, driving stability, and steerability are ensured. The clutch pressure P varies in accordance with the vehicle speed V, the throttle opening degree $\phi$, the steering angle $\theta$ and the gear ratio e to further improve the characteristics.

As described above, when the left-wheel 18L rotates faster than the right-wheel 18R ($N_L > N_R$) and the difference $\Delta N(N_L - N_R)$ of the speeds are smaller than the predetermined value, a clutch pressure P derived from the table is applied to the clutch 40, thereby generating restricting torque Tc. Since the differential case 36 rotates faster than the right wheel speed $N_R$ by $\Delta Nb/2$, a torque is transmitted to the right wheel 18R from the case 36 through the clutch 40. Therefore, when the torque is transmitted to the ring gear 32 is Ti, the left wheel torque and the right wheel torque are expressed as (Ti−Tc)/2 and (Ti+Tc)/2, respectively. Thus, a smaller torque is transmitted to the left wheel than to the right wheel. On the other hand, when the right wheel speed is larger than the left wheel speed ($N_R > N_L$), the left wheel torque is represented by (Ti+Tc)/2 and the right wheel torque is represented by (Ti−Tc)/2, thereby transmitting a larger torque to the left wheels. Thus, by changing the restricting torque Tc of the clutch 40, the differential 35 can be continuously changed from the differential operating state to the locked state.

Figure 3A:
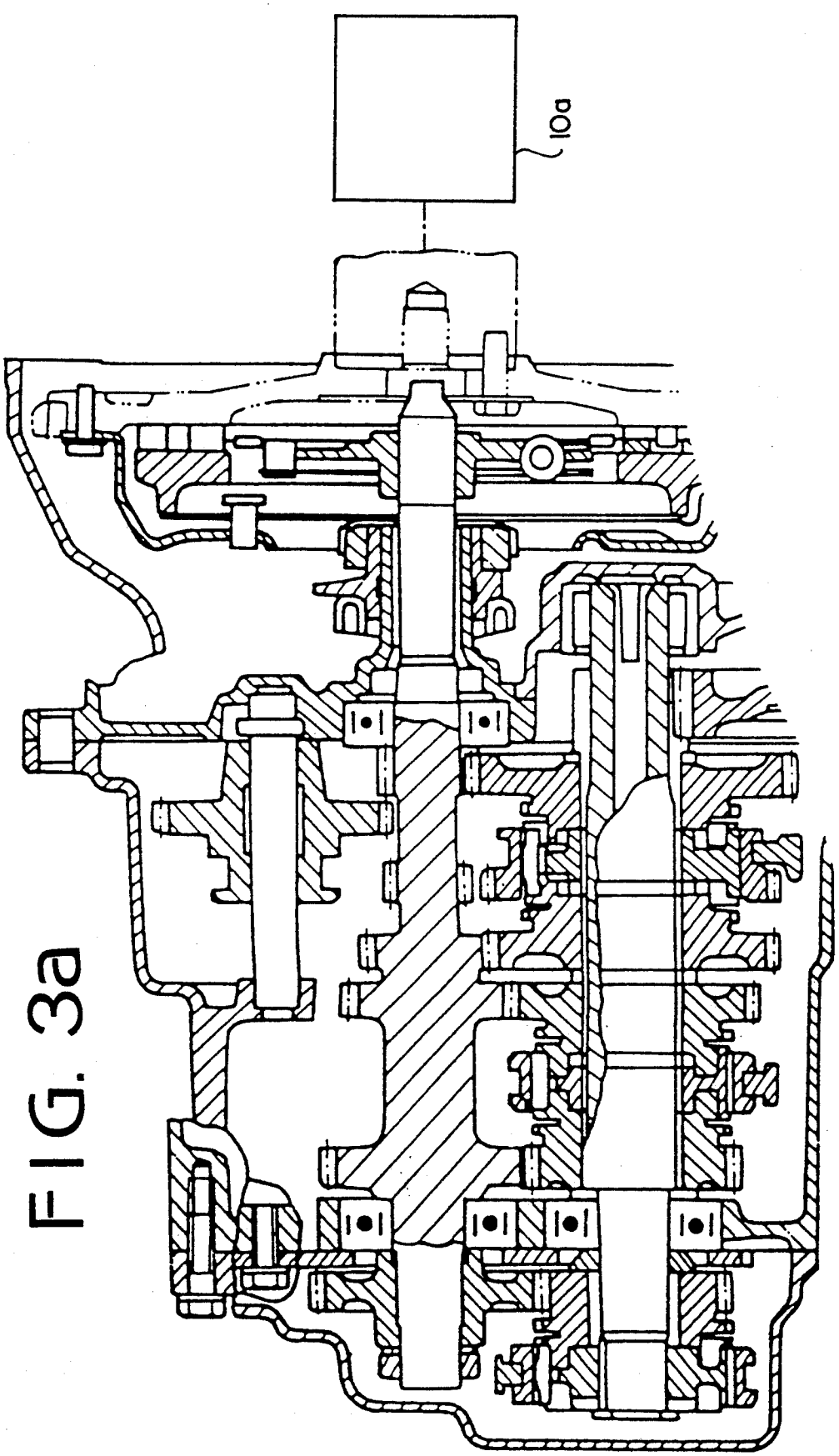
FIGS. 3a and 3b show a sectional view of another embodiment of the present invention.
Figure 3B:
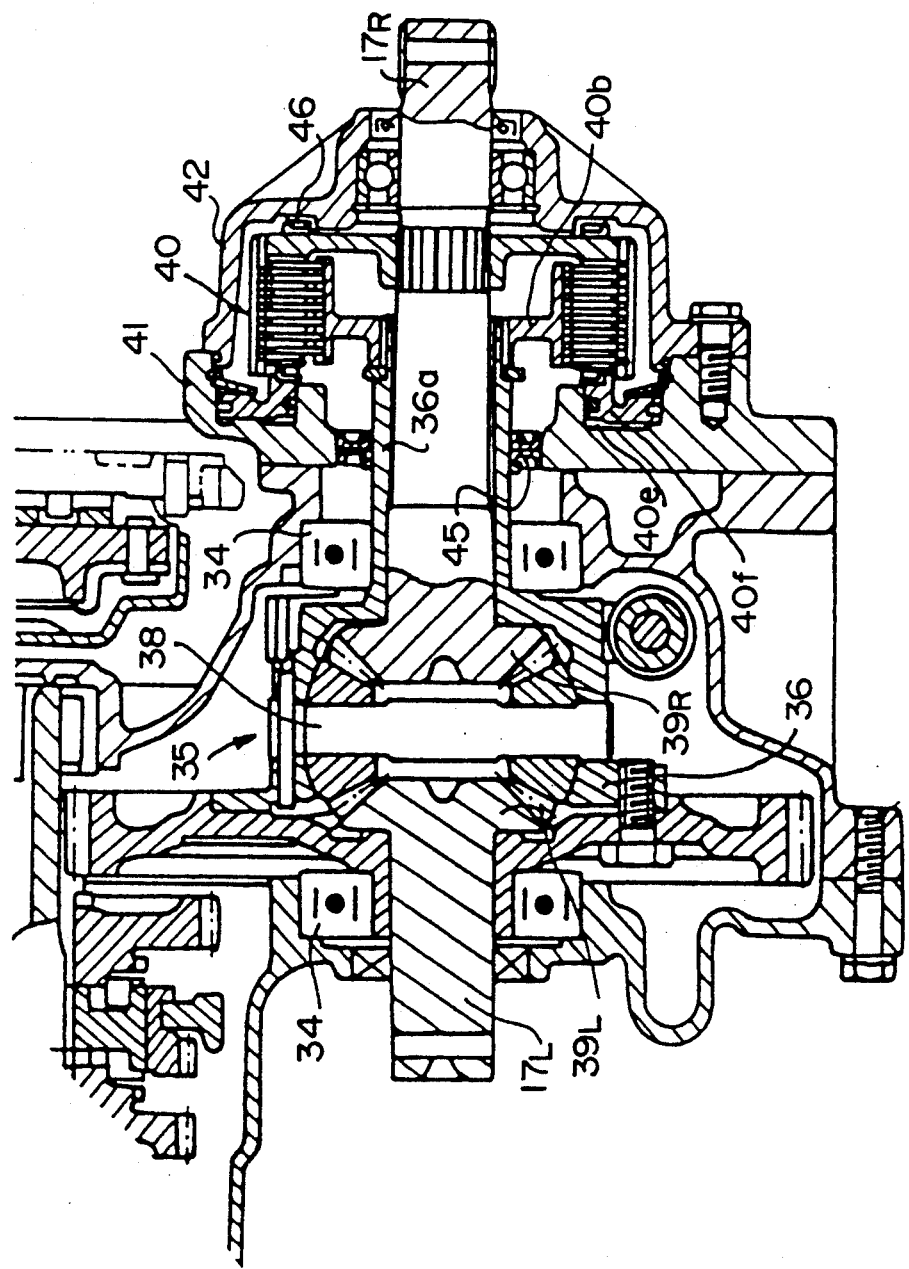

FIGS. 3a and 3b show the second embodiment of the present invention applied to a transaxle power transmission system where an engine 10a is laterally mounted. The same numerals as those in FIGS. 1a to 2b designate the same parts as FIGS. 1, 2a and 2b. The differential restricting clutch 40 is disposed adjacent the differential 35 so that a conventional transaxle need only be slightly modified.

The present invention may be adapted to a rear drive vehicle with a rear-mounted engine and also to a vehicle provided with an automatic transmission or a continuously variable transmission.

In accordance with the present invention, the differential restricting clutch disposed between the differential case and the side gear operates to produce the torque for restricting the differential operation of the differential. The differential operation restricting torque is changed dependent on the driving conditions of the motor vehicle so that the vehicle can be easily and stably driven on slippery roads. Further, optimum driveability, driving stability, and starting characteristics of the vehicle are obtained and steerability of the vehicle is improved when the vehicle is normally driven without slipping.

The differential operation restricting clutch can be easily installed in a conventional transaxle by disposing the clutch adjacent the differential.

Since the clutch is provided separated from the hypoid gears, oil having the appropriate characteristic can be used. Thus, the sticking/slipping of disks does not occur when the wheels turn around a corner.

Further, the piston chamber does not rotate, so that centrifugal force in the piston oil chamber does not occur, thereby ensuring the control of the clutch pressure.

The oil pump and the oil pressure control unit are provided adjacent the clutch, whereby the hydraulic circuit is shortened to quickly actuate the clutch.

While the presently preferred embodiments of the present invention have been shown as described, it is to be understood that these disclosures are for the purpose of illustration and that various changes and modifications may be made without departing from scope of the invention as set forth in the appended claims.

What is claimed is:

1. In a device for restricting differential operation for a two-wheel drive motor vehicle having driving wheels and an engine mounted on said motor vehicle producing power from a crank shaft, a main clutch connected to said crank shaft, a trans-axle type transmission connected to said main clutch for operatively transmitting said power to an axle of the driving wheels of the vehicle, a differential having a final reduction gear connected to said transmission, and the differential being connected to said axle and for differentiating speed of said wheels, the improvement in the device which comprises:

a fluid-operated clutch mounted in a non-rotatable cover of said differential and operatively connected to said differential so as to restrict the differential operation;
   a clutch oil in said fluid operated clutch;
   control means for controlling a pressure of said fluid-operated clutch in accordance with driving conditions of said motor vehicle and road surface conditions;
   a lubricating oil which is a different type of oil than said clutch oil; and
   oil seal means interposed between said fluid-operated clutch and said differential for separating said clutch oil form said lubricating oil in order to avoid mixing of said clutch oil with said lubricating oil;
   said fluid-operated clutch further comprises:
   an outer drum operatively connected to a differential case of said differential;
   an inner drum operatively connected to said axle;
   a plurality of inner disks secured to said inner drum;
   a plurality of outer disks secured to said outer drum;
   a piston slidably but non-rotatably inserted in a non-rotatable piston chamber formed in said cover and operated by said clutch oil in the piston chamber in order to engage said inner and outer disks with each other; and
   a centrifugal oil pressure chamber being integrally formed in said cover adjacent said piston chamber with said piston separating said centrifugal oil pressure chamber and said piston chamber, the piston chamber for applying said pressure to said piston without being effected by centrifugal force of said clutch oil due to rotation of said axle.

2. The device according to claim 1, wherein the control means includes means for detecting slipping of one of right and left driving wheels in accordance with the difference between right wheel speed and left wheel speed, and operating means responsive to the slipping for engaging the fluid-operated clutch.

3. In a device for restricting differential operation for a two-wheel drive motor vehicle having driving wheels and an engine mounted on said motor vehicle producing power from a crank shaft, a main clutch connected to said crank shaft, a trans-axle type transmission connected to said main clutch for operatively transmitting said power to an axle of the driving wheels of the vehicle, a differential having a final reduction gear connected to said transmission, and the differential being connected to said axle and for differentiating speed of said wheels, the improvement in the device which comprises:

a fluid-operated clutch mounted in a non-rotatable cover of said differential and operatively connected to said differential so as to restrict the differential operation;
   a clutch oil in said fluid-operated clutch;
   control means for controlling a pressure of said fluid-operated clutch in accordance with driving conditions of said motor vehicle and road surface conditions;
   a lubricating oil which is a different type of oil than said clutch oil; and
   oil seal means interposed between said fluid-operated clutch and said differential for separating said clutch oil form said lubricating oil in order to avoid mixing of said clutch oil with said lubricating oil;
   said fluid-operated clutch further comprises:
   an outer drum connect to said axle;
   an inner drum connected to a differential case of said differential;
   a plurality of inner disks secured to said inner drum;
   a plurality of outer disks secured to said outer drum;
   a piston slidably but non-rotatably inserted in a non-rotatable piston chamber formed in said cover and operated by said clutch oil in the piston chamber in order to engage said inner and outer disks with each other; and
   a centrifugal oil pressure chamber being integrally formed in said cover adjacent said piston chamber with said piston separating said centrifugal oil pressure chamber and said piston chamber, the piston chamber for applying said pressure to said piston without being effected by centrifugal force of said clutch oil due to rotation of said axle.

4. The device according to claim 3, wherein
   said differential has an input connected to said final reduction gear and an output connected to said axle, and
   said fluid-operated clutch is connected between said input and said output.
   said fluid-operated clutch is connected between said input and said output.

5. The device according to claim 4, wherein said input is said differential case of said differential.

6. In a device for restricting differential operation for a two-wheel drive motor vehicle having driving wheels and an engine mounted on said motor vehicle for producing power from a crank shaft, a main clutch connected to said crank shaft, a trans-axle type transmission connected to said main clutch for operatively transmitting said power to an axle of the driving wheels of the vehicle, a differential having a final reduction gear connected to said transmission, and the differential being connected to said axle and for differentiating speed of said wheels, the improvement in the device which comprises:

a non-rotatable cover;
   a fluid-operated clutch mounted in said non-rotatable cover and operatively connected to said differential so as to restrict the differential operation;
   a clutch oil in said fluid-operated clutch;
   control means for controlling a pressure of said fluid-operated clutch in accordance with driving conditions of said motor vehicle and road surface conditions;

a lubricating oil which is a different type of oil than said clutch oil;

oil seal means interposed between said fluid-operated clutch and said differential for separating the clutch oil from said lubricating oil in order to avoid mixing of said clutch oil with said lubricating oil; and said fluid-operated clutch comprising:

an inner and an outer drum;

one of said drums being connected to said axle and the other of said drums being connected to said differential;

a plurality of inner disks secured to said inner drum;

a plurality of outer disks secured to said outer drum;

a piston slidably but non-rotatably inserted in a non-rotatable piston chamber adjacent said cover and operated by said clutch oil in order to engage said inner and outer disks with each other; and a centrifugal oil pressure chamber being integrally formed in said cover, said piston separating said centrifugal oil pressure chamber and said piston chamber, said piston chamber for applying said pressure to said position without being effected by centrifugal force of said clutch oil due to rotation of said axle.

7. The device according to claim 6, further comprising a transmission case in which said transmission is disposed, and said differential is rotatably mounted in said transmission case, a retainer bearing connected to said cover and to said transmission case, said position engages said retainer bearing, and said piston chamber is partly defined by said retainer bearing.

8. The device according to claim 7, wherein said differential has a differential case connected to said other drum, and said oil seal means is mounted between said axle and said differential case, and between said retainer bearing and said differential case.

* * * * *